(12) United States Patent
Ogino et al.

(10) Patent No.: US 12,385,756 B2
(45) Date of Patent: Aug. 12, 2025

(54) INFORMATION PROCESSING DEVICE, INFORMATION OUTPUT METHOD, PROGRAM, AND STORAGE MEDIUM

(71) Applicant: PIONEER CORPORATION, Tokyo (JP)

(72) Inventors: Koichi Ogino, Kawagoe (JP); Takeshi Tanaka, Kawagoe (JP); Kengo Ienaga, Kawagoe (JP)

(73) Assignee: PIONEER CORPORATION, Tokyo (JP)

( * ) Notice: Subject to any disclaimer, the term of this patent is extended or adjusted under 35 U.S.C. 154(b) by 77 days.

(21) Appl. No.: 17/782,060

(22) PCT Filed: Jan. 14, 2021

(86) PCT No.: PCT/JP2021/000976
§ 371 (c)(1),
(2) Date: Jun. 2, 2022

(87) PCT Pub. No.: WO2021/192513
PCT Pub. Date: Sep. 30, 2021

(65) Prior Publication Data
US 2023/0011189 A1    Jan. 12, 2023

(30) Foreign Application Priority Data
Mar. 27, 2020    (JP) ................. 2020-057745

(51) Int. Cl.
*G01C 21/36*    (2006.01)
*G01C 21/34*    (2006.01)

(52) U.S. Cl.
CPC ..... *G01C 21/3629* (2013.01); *G01C 21/3415* (2013.01); *G01C 21/343* (2013.01)

(58) Field of Classification Search
CPC ............ G01C 21/3629; G01C 21/3415; G01C 21/343; G08G 1/096872
See application file for complete search history.

(56) References Cited

U.S. PATENT DOCUMENTS 6,321,161 B1    11/2001  Herbst
9,360,335 B1*    6/2016  Powelson .......... G01C 21/3415
(Continued)

FOREIGN PATENT DOCUMENTS

JP    2000-304560    11/2000
JP    2005-227294    8/2005
(Continued)

OTHER PUBLICATIONS

International Search Report for PCT/JP2021/000976 dated Mar. 23, 2021, 5 pages.
(Continued)

*Primary Examiner* — Anne Marie Antonucci
*Assistant Examiner* — Patrick Daniel Mohl
(74) *Attorney, Agent, or Firm* — NIXON & VANDERHYE (57) ABSTRACT

The information processing device includes a voice guidance unit configured to acquire a current position of the mobile body and perform voice guidance along a route to a destination. When an information request by a user is made by designating a direction different from the direction indicated by a current route at a guide point, the voice guidance unit outputs information on a comparison between the current route and a route to the destination advancing in a designated direction.

19 Claims, 5 Drawing Sheets

(56) References Cited

U.S. PATENT DOCUMENTS

| | | | | |
|---|---|---|---|---|
| 2007/0010941 A1* | 1/2007 | Marsh | ............... | G08G 1/096861 |
| | | | | 701/533 |
| 2010/0324817 A1* | 12/2010 | Hansen | .............. | G01C 21/3632 |
| | | | | 701/414 |
| 2014/0074392 A1* | 3/2014 | Holm | ................. | G01C 21/3415 |
| | | | | 701/400 |
| 2014/0222341 A1* | 8/2014 | Rathi | .................... | G01C 21/362 |
| | | | | 701/538 |
| 2017/0043789 A1* | 2/2017 | Hecht | ................. | B60W 50/085 |
| 2018/0112994 A1* | 4/2018 | Fujikawa | ............. | G01C 21/3688 |
| 2020/0109960 A1* | 4/2020 | Al-Jazrawi | ........ | G01C 21/3694 |
| 2021/0102819 A1* | 4/2021 | Gallo | ............... | G01C 21/3407 |
| 2021/0180977 A1* | 6/2021 | Wiesenberg | ........ | G01C 21/3492 |

FOREIGN PATENT DOCUMENTS

| | | |
|---|---|---|
| JP | 2008-215860 | 9/2008 |
| JP | 2017-138277 | 8/2017 |
| JP | 2019-132776 | 8/2019 |
| WO | 2007/122960 | 11/2007 |
| WO | 2017015882 A1 | 2/2017 |

OTHER PUBLICATIONS

Written Opinion of the ISA for PCT/JP2021/000976 dated March 23, 2021, 3 pages.

Extended European Search Report, issued in European Patent Application No. 21774819.3 dated Jun. 4, 2024.

\* cited by examiner

ABSTRACT

INFORMATION PROCESSING DEVICE, INFORMATION OUTPUT METHOD, PROGRAM, AND STORAGE MEDIUM

CROSS-REFERENCE TO RELATED APPLICATIONS

This application is the U.S. national phase of International Application No. PCT/JP2021/000976 filed Jan. 14, 2021 which designated the U.S. and claims priority to Japanese Patent Application No. 2020-057745 filed Mar. 27, 2020, the entire contents of each of which are hereby incorporated by reference.

BACKGROUND OF THE INVENTION

The present invention relates to route guidance by voice.

Field of the Invention

Conventionally, there is known a navigation device for performing route guidance to a destination by voice. For example, Patent Document 1 discloses a voice navigation system for notifying the approximate distance and orientation from the current location to the destination by increasing the spread of the sound field as the distance from the current location to the destination is small, and localizing the sound output from the speaker so that the sound is heard from the direction of the destination with respect to the head of the user.

Description of the Related Art

Patent Reference 1: Japanese Patent Application Laid-open under 2017-138277

During route guidance by a navigation device, the driver may want to know what happens if he/she travels on a route different from the guide route. For example, when the guide route indicates a right turn at the guiding point but the right turn direction is congested and the straight direction is not crowded, the user may think that going straight may be faster. Therefore, it is convenient if the driver can know what happens if he/she travels in a direction different from the guide route.

The present invention has been made to solve the problems as described above, and a main object thereof is to provide an information processing device capable of letting the user know what happens if he/she travels on a route different from the guide route.

SUMMARY OF THE INVENTION

One embodiment is an information processing device for providing information on movement of a mobile body, comprising: a voice guidance unit configured to acquire a current position of the mobile body and perform voice guidance along a route to a destination, wherein, when an information request by a user is made by designating a direction different from the direction indicated by a current route at a guide point, the voice guidance unit outputs information on a comparison between the current route and a route to the destination advancing in a designated direction.

Another embodiment is an information output method executed by an information processing device for providing information on movement of a mobile body, comprising: a voice guidance process which acquires a current position of the mobile body and performs voice guidance along a route to a destination, wherein, when an information request by a user is made by designating a direction different from the direction indicated by a current route at a guide point, the voice guidance process outputs information on a comparison between the current route and a route to the destination advancing in a designated direction.

Yet another embodiment is a program executed by an information processing device including a computer and provides information on movement of a mobile object, the program causing the computer to function as: a voice guidance unit configured to acquire a current position of the mobile body and perform voice guidance along a route to a destination, wherein, when an information request by a user is made by designating a direction different from the direction indicated by a current route at a guide point, the voice guidance unit outputs information on a comparison between the current route and a route to the destination advancing in a designated direction.

DETAILED DESCRIPTION OF THE PREFERRED EMBODIMENTS

According to a preferred embodiment of the present invention, there is provided an information processing device for providing information on movement of a mobile body, comprising: a voice guidance unit configured to acquire a current position of the mobile body and perform voice guidance along a route to a destination, wherein, when an information request by a user is made by designating a direction different from the direction indicated by a current route at a guide point, the voice guidance unit outputs information on a comparison between the current route and a route to the destination advancing in a designated direction.

The above information processing device includes a voice guidance unit configured to acquire a current position of the mobile body and perform voice guidance along a route to a destination. When an information request by a user is made by designating a direction different from the direction indicated by a current route at a guide point, the voice guidance unit outputs information on a comparison between the current route and a route to the destination advancing in a designated direction. This allows the user to know what happens if he/she proceeds in a direction different from the current guide route.

In one mode of the above information processing device, when the information request is made, the voice guidance unit calculates a new route advancing in the designated direction and reaching the destination, and outputs information on a comparison between the current route and the new route. In this mode, a new route advancing in the designated direction is calculated, and information is output based on the new route.

In another mode of the above information processing device, when the information request relates to a required time to the destination, the voice guide unit outputs information on a comparison of the required time. Also, when the information request relates to a distance to the destination, the voice guide unit outputs information on a comparison of the distances. Also, when the information request relates to a traveling charge to the destination, the voice guidance unit outputs information on a comparison of the traveling charge. Also, when the information request relates to a feature of a traveling route to the destination, the voice guidance unit outputs information on a comparison of the features of the traveling routes.

According to another preferred embodiment of the present invention, there is provided an information output method executed by an information processing device for providing information on movement of a mobile body, comprising: a voice guidance process which acquires a current position of the mobile body and performs voice guidance along a route to a destination, wherein, when an information request by a user is made by designating a direction different from the direction indicated by a current route at a guide point, the voice guidance process outputs information on a comparison between the current route and a route to the destination advancing in a designated direction. This allows the user to know what happens if he/she proceeds in a direction different from the current guide route.

According to still another preferred embodiment of the present invention, there is provided a program executed by an information processing device including a computer and provides information on movement of a mobile object, the program causing the computer to function as: a voice guidance unit configured to acquire a current position of the mobile body and perform voice guidance along a route to a destination, wherein, when an information request by a user is made by designating a direction different from the direction indicated by a current route at a guide point, the voice guidance unit outputs information on a comparison between the current route and a route to the destination advancing in a designated direction. By executing the program by the computer, the above information processing device may be realized. This program can be stored in a storage medium and used.

EMBODIMENTS

Hereinafter, suitable embodiments of the present invention will be described with reference to drawings.

First Embodiment

System Configuration

Figure 1:
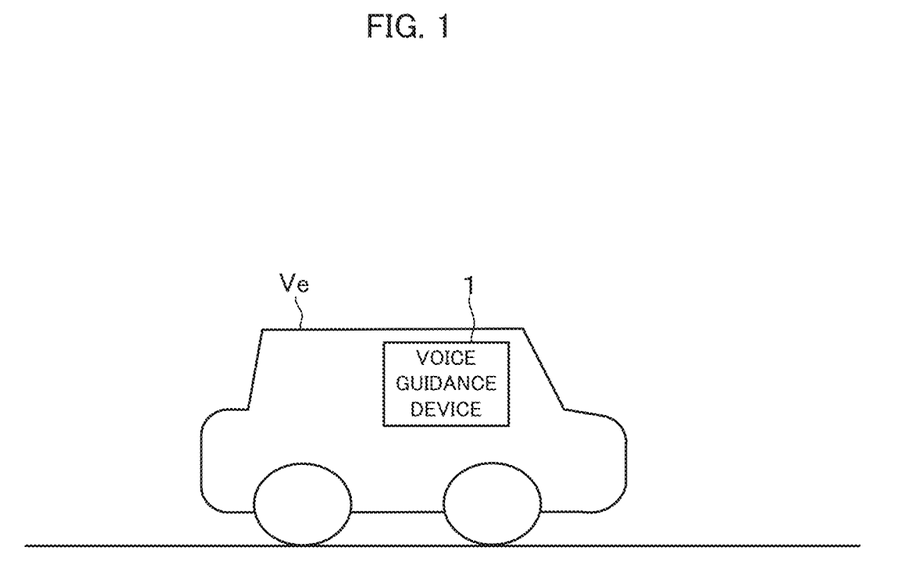
FIG. 1 illustrates a configuration example of a voice guidance system according to a first embodiment.

FIG. 1 illustrates a configuration example of a voice guidance system according to a first embodiment of the information processing device of the present invention. The voice guidance system includes a vehicle Ve and a voice guidance device 1.

The voice guidance device 1 moves with the vehicle Ve, and performs a route guidance mainly by voice so that the vehicle Ve travels along the route to be guided (also referred to as "guide route"). Incidentally, the "route guidance mainly by voice" refers to a route guidance in which the user can obtain information necessary for driving the vehicle Ve along the guide route at least from the voice only, and it does not intend to exclude that the voice guidance device 1 supplementarily displays the map around the current position. In this embodiment, the voice guidance device 1 outputs at least information relating to a point (also referred to as a "guiding point") on a route where guidance is necessary by voice. Here, for example, the guiding point includes intersections with the right/left turn of the vehicle Ve, and other important passing points for the vehicle Ve to travel along the guide route. For example, the voice guidance device 1 performs voice guidance related to the guiding point, such as the distance from the vehicle Ve to the next guiding point and the traveling direction at the guiding point. Hereafter, the voice related to the guidance of the guidance route is also referred to as "route voice guidance".

Incidentally, the voice guidance device 1 may be an on-vehicle device mounted or attached to the vehicle Ve, or may be a portable terminal to be brought and utilized in a vehicle such as a smartphone. In yet another example, the voice guidance device 1 may be incorporated into the vehicle Ve. The voice guidance device 1 is an example of an "information processing device". Further, the vehicle Ve is an example of a "mobile body".

Device Configuration

Figure 2:
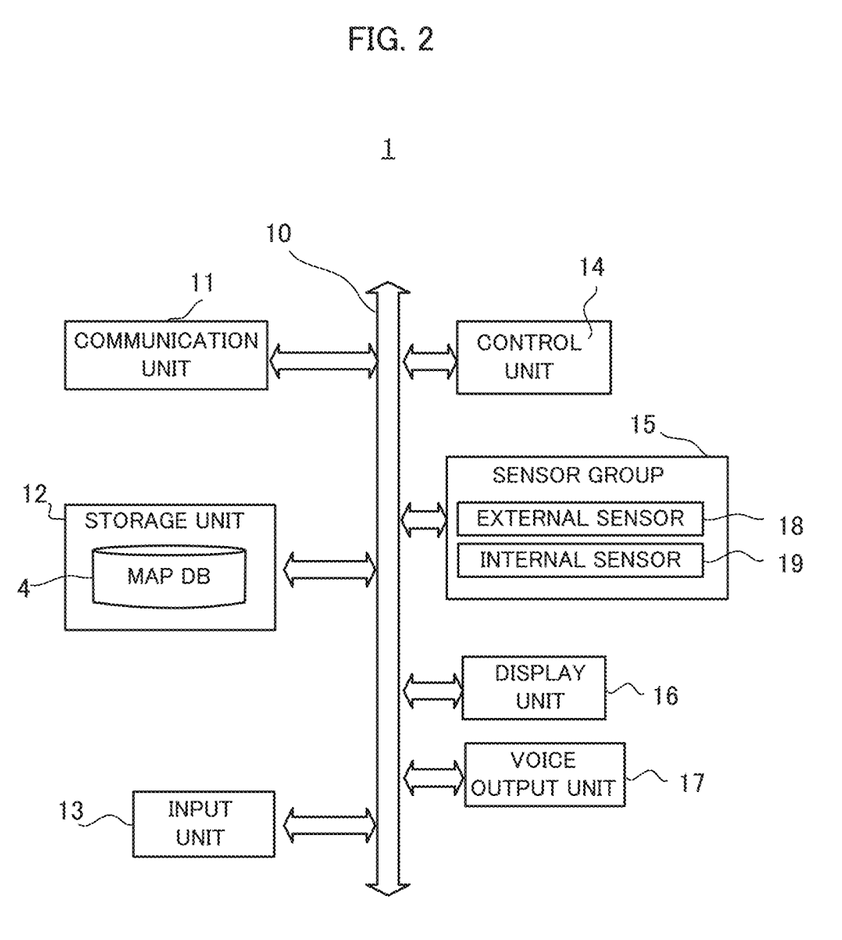
FIG. 2 illustrates an example of a schematic configuration of a voice guidance device.

FIG. 2 shows an example of a schematic configuration of a voice guidance device 1. The voice guidance device 1 mainly includes a communication unit 11, a storage unit 12, an input unit 13, a control unit 14, a sensor group 15, a display unit 16, and a voice output unit 17. Each element in the voice guidance device 1 is connected to each other via a bus line 10.

The communication unit 11 performs data communication with the other terminals based on the control of the control unit 14. For example, the communication unit 11 may receive map data for updating the map DB (DataBase) 4 to be described later from a map management server (not shown).

The storage unit 12 is composed of various memories such as a RAM (Random Access Memory), a ROM (Read Only Memory), and a non-volatile memory (including a hard disk drive, a flash memory, and the like). The storage unit 12 stores a program for the voice guidance device 1 to execute a predetermined process. The above-described program may include an application program for performing the route guidance by voice, an application program for playing music, an application program for outputting content other than music (such as a TV), and the like. The storage unit 12 is also used as a work memory of the control unit 14. The program to be executed by the voice guidance device 1 may be stored in a storage medium other than the storage unit 12.

Further, the storage unit 12 stores the map DB 4. The map DB 4 records various types of data required for the route guidance. The map DB 4 is a database that includes, for example, road data representing a road network by a combination of nodes and links, and facility data representing facilities that are candidates for a destination, stopover points, or landmarks. The map DB 4 may be updated based on the map information that the communication unit 11 receives from the map management server, under the control of the control unit 14.

The input unit 13 is a button, a touch panel, a remote controller, a voice input device, or the like for the user to operate. The display unit 16 is a display or the like for performing display under the control of the control unit 14. The voice output unit 17 is a speaker or the like for outputting sound under the control of the control unit 14.

The sensor group 15 includes an external sensor 18 and an internal sensor 19. The external sensor 18 may be one or more sensors for recognizing the surrounding environment of the vehicle Ve such as a camera, a lidar, a radar, an ultrasonic sensor, an infrared sensor, a sonar, and the like. The internal sensor 19 is a sensor for positioning the vehicle Ve, for example, a GNSS (Global Navigation Satellite System) receiver, a gyroscopic sensor, IMU (Inertial Measurement Unit), a vehicle speed sensor, or a combination thereof. The sensor group 15 may have a sensor by which the control unit 14 can directly or indirectly (i.e., by performing the estimation process) derive the position of the vehicle Ve from the output of the sensor group 15.

The control unit 14 includes a CPU (Central Processing Unit), a GPU (Graphics Processing Unit), and the like, and controls the entire voice guidance device 1. For example, based on the output of one or more sensors of the sensor group 15, the control unit 14 estimates the position of the vehicle Ve (including the direction of the traveling direction). Further, when the destination is designated by the input unit 13, the control unit 14 generates a route information indicating a guide route to the destination, and performs the route guidance based on the route information, the position information of the estimated vehicle Ve, and the map DB 4. In this case, the control unit 14 controls the voice output unit 17 to output the route voice guidance. Further, the control unit 14 controls the display unit 16 to display the information of the music being played, the video content, or as a map around the current position. The control unit 14 and the voice output unit 17 are examples of a voice guidance unit.

Incidentally, the processing executed by the control unit 14 is not limited to be realized by software by a program, and it may be realized by any combination of hardware, firmware, and software. The process executed by the control unit 14 may be realized by an integrated circuit that can be programmed by the user, for example, a FPGA (field-programmable gate array) or a microcomputer. In this case, a program that the control unit 14 implements in this embodiment may be realized by the integrated circuit. Thus, the control unit 14 may be realized by hardware other than the processor.

The configuration of the voice guidance device 1 shown in FIG. 2 is merely an example, and various changes may be made to the configuration shown in FIG. 2. For example, instead of storing the map DB 4 in the storage unit 12, the control unit 14 may receive information required for the route guidance through the communication unit 11 from the map management server (not shown). In another example, instead of providing the voice output unit 17, the voice guidance device 1 may be connected, electrically or by known communication means, to a different voice output unit 17 which is configured separately from the voice guidance device 1, and the different voice output unit 17 may output the sound. In this case, the different voice output unit 17 may be a speaker provided in the vehicle Ve. In yet another example, the voice guidance device 1 may not include a display unit 16. In this case, the voice guidance device 1 may not perform any control relating to the display. Alternatively, by electrically connecting to the display unit provided in the vehicle Ve or the like by a wired or wireless connection, the voice guidance device 1 may make the display unit execute a predetermined display. Similarly, instead of including the sensor group 15, the voice guidance device 1 may acquire information outputted by the sensors attached to the vehicle Ve from the vehicle Ve, based on a communication protocol such as CAN (Controller Area Network).

Information Request on a Route Different from a Guide Route

Next, a process in which the user requests information on a route different from the guide route will be described. During the route guidance, the user may want to know what happens if he/she travels on a route different from the guide route. For example, when the guide route indicates a right turn at the guiding point but the right turn direction is congested and the straight direction is not crowded, the user may think that going straight may be faster. Therefore, it is convenient if the user can know what happens if he/she travels in a direction different from the guide route.

In this view, in this embodiment, the user can request information on a route different from the guide route. Specifically, during the route guidance, the user designates a traveling direction and requests information on the case where the user travels in the designated traveling direction. For example, when the guide route indicates a right turn at a certain guide point, the user makes an audio input such as "What happens if I go straight here?". Incidentally, the information request may be performed before the vehicle enters the guiding point. For example, the user may ask "What happens if I go straight at the next guide point?" or the like before the vehicle enters the intersection corresponding to the guide point. Also, for example, when a route can be calculated for each lane, the user may ask "What happens if I go the right-side lane?" or the like.

In response, the voice guidance device 1 calculates a new route which advances in the traveling direction designated by the user and reaches the same destination as the guide route that is currently set (hereinafter, referred to as "alternative route"). Then, the voice guidance device 1 outputs voice information on the comparison between the current guide route and the alternative route. Specifically, the voice guidance device 1 outputs at least one of a difference in the traveling distance when the user travels along the alternative route instead of the guide route, a difference in the required time to the destination, a difference in the arrival time to the destination, and a difference in the traveling charge when using a toll road or the like. For example, the voice guidance device 1 outputs such information that the alternative route takes more time, the arrival time becomes 10 minutes later, the alternative route is 5 minutes earlier but the traveling charge is 300 yen higher, or there is not much time difference between the alternative route and the guide route. Incidentally, the voice guidance device 1 may further output a difference in features of the guide route and the alternative route. For example, the voice guidance device 1 may further output the difference between the environment of the guide route and the alternative route, such as that the alternative route includes more curves, better landscape, more convenience stores, and more lane changes.

In the above examples, the user simply asks for the information like "What happens if I go straight here?" without specifying the information that he/she wants. However, when the user specifies the information that he/she wants and requests the information, the voice guidance device 1 may outputs that information first. Specifically, when the user requests the information by specifying the required time, the arrival time, the traveling charge, the features of the traveling route, etc., the voice guidance device 1 may first provide the information requested by the user. For example, if the user asks "Is it faster to go straight here?", the information that the user wants is a difference in the required time. Therefore, the voice guidance device 1 may output information on the required time, such as "5 minutes later." Incidentally, in this case, the voice guidance device 1 may additionally output information on the traveling charge or the features of the traveling routes.

Figure 3:
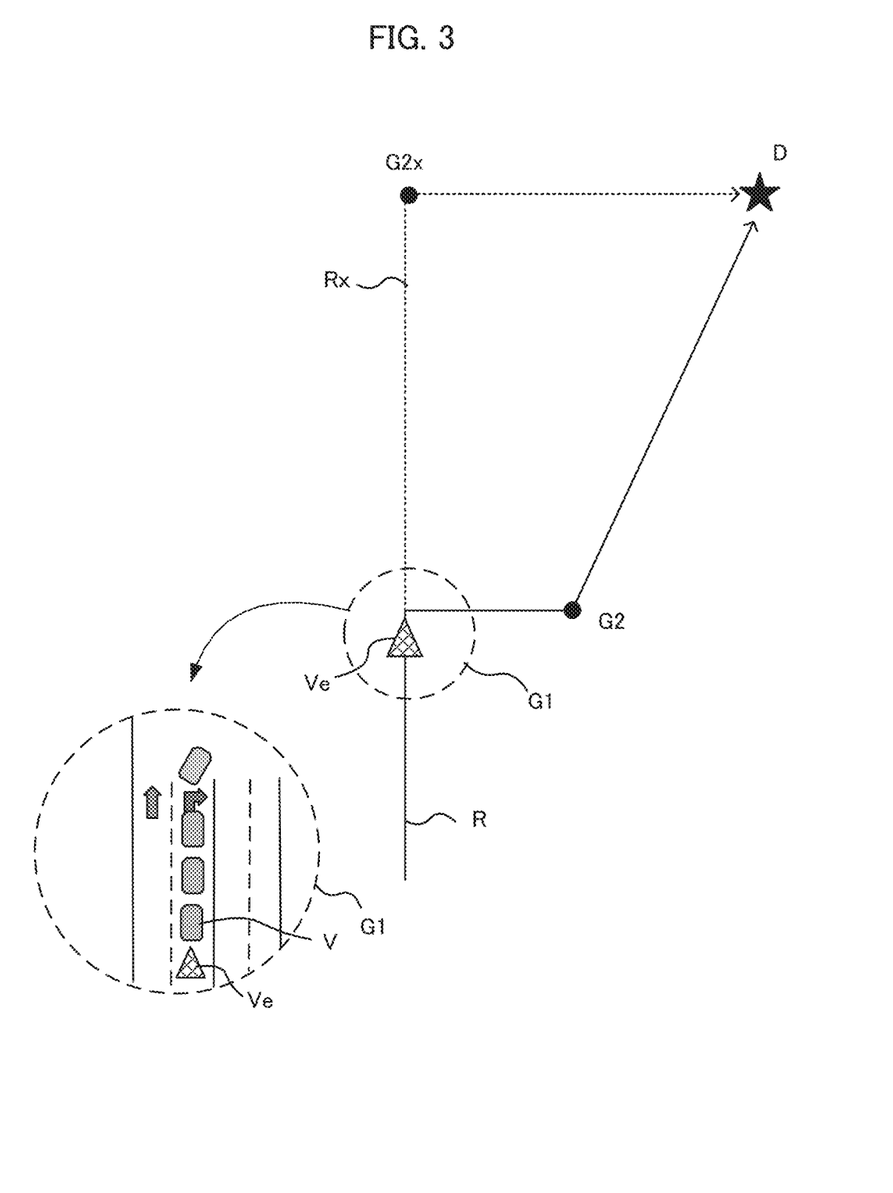
FIG. 3 shows an example of a situation in which a user requests an information on a route different from a guide route.

FIG. 3 shows an example of a situation in which the user requests an information on a route different from the guide route. Now, it is assumed that the vehicle Ve is traveling along the guide route R. The guide route R is a route to reach the destination D after passing through the guide point G1, the guide point G2 in this order. It is assumed that the vehicle Ve has entered the intersection corresponding to the next guide point G1. Here, while the vehicle Ve needs to turn right at the guide point G1 according to the guide route R, the right turn lane is congested by other vehicles V as shown in the enlarged view of the guide point G1.

In this case, the user requests information on the case of going straight at this guide point G1. For example, the user makes an audio input such as "What happens if I go straight here?". When such a voice input is made, the voice guidance device 1 calculates an alternative route from the current position of the vehicle to the destination D in the case of going straight at the guide point G1, and outputs information on the comparison between the current guide route and the alternative route. In the example of FIG. 3, the voice guidance device 1 calculates an alternative route Rx indicated by a broken line, and outputs information on the differences such as the required time, the arrival time, the traveling charge, and the features of the traveling routes between the cases of traveling the guide route R and traveling the alternative route Rx.

Figure 4:
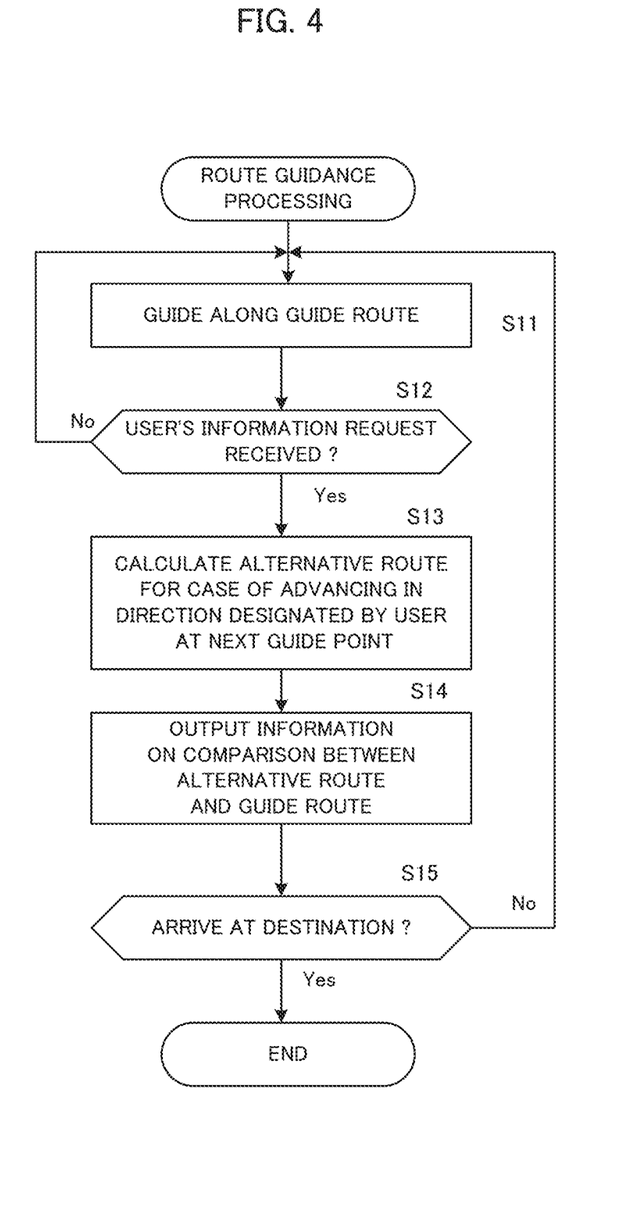
FIG. 4 is a flowchart of a route guidance processing.

FIG. 4 is a flowchart of the route guidance processing. When the destination is set by the user and the route guidance is started, the voice guidance device 1 performs the guidance along the guide route (step S11). Next, the voice guidance device 1 determines whether or not the user's information request of the route different from the guide route is received as described above (step S12).

If the user's information request is not received (step S12: No), the process returns to step S11. On the other hand, when the user's information request is received (step S12: Yes), the voice guidance device 1 calculates an alternative route for the case of advancing in a direction different from the guide route at the next guide point (step S13), and outputs information on the comparison between the alternative route and the guide route (Step S14).

Next, the voice guidance device 1 determines whether or not the vehicle has arrived at the destination (step S15). If the vehicle has not arrived at the destination (step S15: No), the process returns to step S11. On the other hand, when the vehicle arrives at the destination (step S15: Yes), the route guidance processing ends.

As described above, according to the present embodiment, when the user designates a direction different from the guide route and makes an information request, the voice guidance device 1 provides information on the comparison between the current guide route and the alternative route going in the designated direction. Thus, the user can determine which direction to proceed, taking into account the information provided.

Incidentally, when the user thinks that the alternative route is better after hearing the information on the comparison between the alternative route and the guide route, the user may travel along the alternative route. The voice guidance device 1 automatically performs a so-called reroute to change the guide route when the current position of the vehicle Ve deviates from the guide route. Alternatively, the voice guidance device 1 may change the guide route after receiving the instruction of changing the current route to the alternative route from the user. By this, the alternative route is set to the guide route, and then the user can travel along the alternative route.

Second Embodiment

Figure 5:
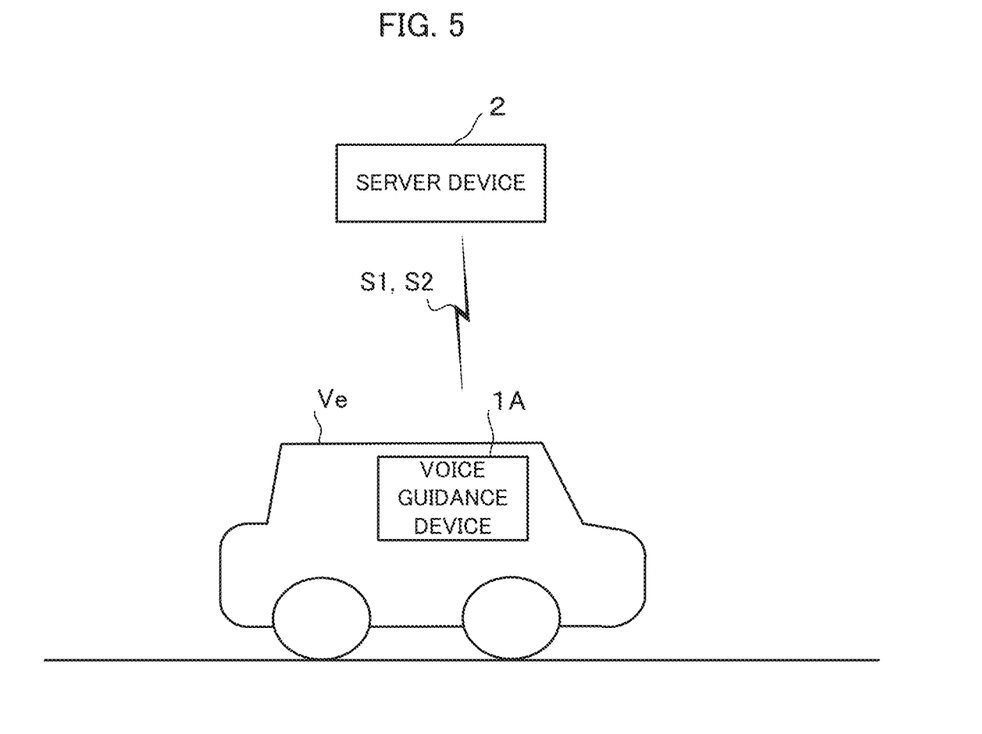
FIG. 5 is a configuration example of a voice guidance system according to a second embodiment.

FIG. 5 is a configuration example of a voice guidance system according to the second embodiment. The voice guidance system according to the second embodiment mainly includes a vehicle Ve, a voice guidance device 1A, and a server device 2. Incidentally, the same components as in the first embodiment are appropriately denoted by the same reference numerals as the components of the first embodiment, and the description thereof will be omitted.

The voice guidance device 1A has the same configuration as the voice guidance device 1 described in the first embodiment described above (see FIG. 2). In the second embodiment, since the server device 2 performs the route search processing and the route guidance processing based on the map DB 4, the voice guidance device 1A may not have a map DB 4. Then, when the voice guidance device 1A detects the input by the user specifying the destination or the like via the input unit 13, the voice guidance device 1A transmits the upload signal "S1" including the position information of the vehicle Ve outputted by the sensor group 15 and the information related to the specified destination to the server device 2.

Also, when the user makes an information request of the route different from the guide route, the voice guidance device 1A supplies the server device 2 with the upload signal S1 including the user's request and the information indicating the traveling state of the vehicle Ve at that time. Further, when the voice guidance device 1A receives the control signal "S2" related to the voice output from the server device 2 when the vehicle Ve is traveling, the voice guidance device 1A outputs voice by the voice output unit 17 based on the control signal S2. In this case, the voice guidance device 1A outputs information on the comparison between the guide route and the alternative route, based on the control signal S2.

The server device 2 generates a route information indicating a guide route to be traveled by the vehicle Ve based on the upload signal S1 including a destination or the like received from the voice guidance device 1A. Then, the server device 2 generates the control signal S2 including the information on the comparison between the guide route and the alternative route on the basis of the information request of the user and the traveling state of the vehicle Ve indicated by the upload signal S1 transmitted by the voice guidance device 1A. Then, the server device 2 transmits the generated control signal S2 to the voice guidance device 1A.

Figure 6:
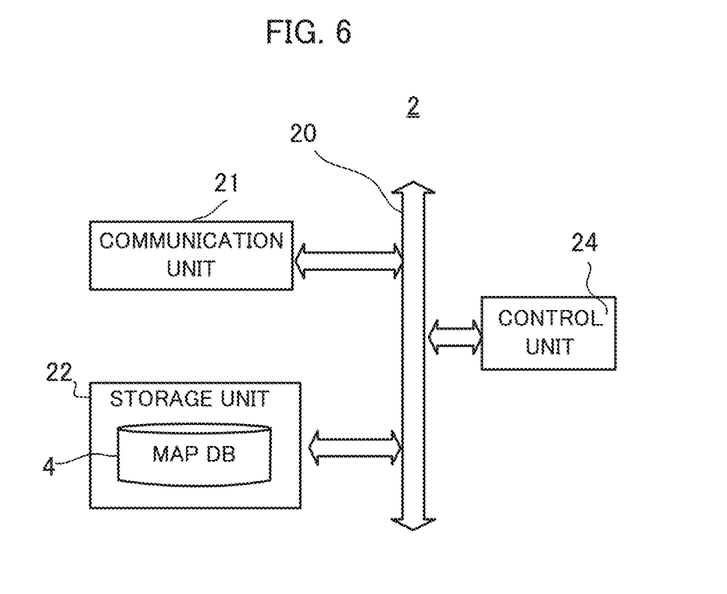
FIG. 6 illustrates an example of a schematic configuration of a server device.

FIG. 6 shows an example of a schematic configuration of the server device 2. The server device 2 mainly includes a communication unit 21, a storage unit 22, and a control unit 24. Each element in the server device 2 is interconnected via a bus line 20.

The communication unit 21 performs data communication with an external device such as a voice guidance device 1A under the control of the control unit 24. The storage unit 22 is composed of various memories such as a RAM, a ROM, and a non-volatile memory (including a hard disk drive, a flash memory, and the like). The storage unit 22 stores a program for the server device 2 to execute a predetermined processing. Further, the storage unit 22 includes a map DB 4. The control unit 24 includes a CPU, a GPU, and the like, and controls the entire server device 2. Also, the control unit 24 executes at least a part of the processing of the voice guidance device 1 described in the above example, by executing a program stored in the storage unit 22. For example, based on the upload signal S1 received via the communication unit 21 from the voice guidance device 1A, the control unit 24 generates the route information indicating the guide route, and generates the control signal S2 relating to the information output in response to the information request of the user. Then, the control unit 24 transmits the generated control signal S2 to the voice guidance device 1A by the communication unit 21.

As described above, even when the server device 2 substantially controls the voice guidance device 1A related to the route guidance, the voice guidance system can output information on the comparison between the guide route and the alternative route, similarly to the first embodiment. In the second embodiment, the server device 2 is an example of an "information processing device".

In the embodiments described above, the program may be stored using various types of non-transitory computer-readable medium and can be supplied to a control unit or the like that is a computer. The non-transitory computer-readable medium includes a storage medium (tangible storage medium) of various types of entities. Examples of the non-transitory computer-readable medium include a magnetic storage medium (e.g., a flexible disk, a magnetic tape, a hard disk drive), a magnetooptical storage medium (e.g., a magnetooptical disk), a CD-ROM (Read Only Memory), a CD-R, a CD-R/W, a solid-state memory (e.g., a mask ROM, a PROM (Programmable ROM), an EPROM (an Erasable PROM, a flash ROM, a RAM (Random Access Memory)).

While the mobile body is a vehicle in the above-described embodiment, the mobile body is not limited to the vehicle. For example, the mobile body may be a pedestrian, and the embodiment may be applied to the navigation for the pedestrian which uses a mobile terminal such as a smartphone as the voice guidance device.

While the present invention has been described with reference to the embodiments, the present invention is not limited to the above embodiments. Various changes that can be understood by those skilled in the art within the scope of the present invention can be made in the configuration and details of the present invention. In other words, it is needless to say that the present invention includes various modifications and modifications that could be made by a person skilled in the art according to the entire disclosure, including the scope of the claims, and the technical philosophy. In addition, each disclosure of the above-mentioned patent documents, etc. cited shall be incorporated with reference to this document.

BRIEF DESCRIPTION OF REFERENCE NUMBERS

1 Voice guidance device
2 Server device
4 Map DB
11, 21 Communication unit
12, 22 Storage unit
13 Input unit
14, 24 Control unit
15 Sensor group
16 Display unit
17 Voice output unit

The invention claimed is:

1. A voice guidance device for providing information on movement of a mobile body, the voice guidance device comprising:
   a memory configured to store instructions;
   a speaker disposed in the mobile body; and
   a processor configured to execute the instructions to:
      acquire a current position of the mobile body,
      calculate a first guide route from the current position of the mobile body to a destination,
      output route guidance which guides a user to the destination along the first guide route via the speaker,
      receive a voice input of an information request by the user designating a second direction to travel at a guide point lying directly on the first guide route, the second direction being different from a first direction indicated by the first guide route at the guide point on the first guide route,
      calculate a second guide route advancing in the second direction at the guide point and reaching the destination, the second guide route deviating from the first guide route at the guide point, and
      output information on a comparison between the first guide route and the second guide route to the speaker disposed in the mobile body, the output information relating to one or more of: (i) respective distances to the destination along the first and second guide routes, (ii) respective times to the destination along the first and second guide routes, (iii) respective environments of the first and second guide routes, and (iv) respective traveling charges along the first and second guide routes,
   wherein the speaker broadcasts the output information to the user in the mobile body.

2. The voice guidance device according to claim 1, wherein, when the information request relates to a required time to the destination, the processor outputs information on a comparison of the respective times to the destination along the first and second guide routes.

3. The voice guidance device according to claim 2, wherein, when the information request relates to a distance to the destination, the processor outputs information on a comparison of the respective distances to the destination along the first and second guide routes.

4. The voice guidance device according to claim 3, wherein, when the information request relates to a traveling charge to the destination, the processor outputs information on a comparison of the respective traveling charges to the destination along the first and second guide routes.

5. The voice guidance device according to claim 3, wherein, when the information request relates to a feature of a traveling route to the destination, the processor outputs information on a comparison of respective features of the first and second guide routes.

6. The voice guidance device according to claim 2, wherein, when the information request relates to a traveling charge to the destination, the processor outputs information on a comparison of the respective traveling charges to the destination along the first and second guide routes.

7. The voice guidance device according to claim 6, wherein, when the information request relates to a feature of a traveling route to the destination, the processor outputs information on a comparison of respective features of the first and second guide routes.

8. The voice guidance device according to claim 2, wherein, when the information request relates to a feature of a traveling route to the destination, the processor outputs information on a comparison of respective features of the first and second guide routes.

9. The voice guidance device according to claim 1, wherein, when the information request relates to a distance to the destination, the processor outputs information on a comparison of the respective distances to the destination along the first and second guide routes.

10. The voice guidance device according to claim 9, wherein, when the information request relates to a traveling charge to the destination, the processor outputs information on a comparison of the respective traveling charges to the destination along the first and second guide routes.

11. The voice guidance device according to claim 9, wherein, when the information request relates to a feature of a traveling route to the destination, the processor outputs information on a comparison of respective features of the first and second guide routes.

12. The voice guidance device according to claim 1, wherein, when the information request relates to a traveling charge to the destination, the processor outputs information on a comparison of the respective traveling charges to the destination along the first and second guide routes.

13. The voice guidance device according to claim 12, wherein, when the information request relates to a feature of a traveling route to the destination, the processor outputs information on a comparison of respective features of the first and second guide routes.

14. The voice guidance device according to claim 1, wherein, when the information request relates to a feature of a traveling route to the destination, the processor outputs information on a comparison of respective features of the first and second guide routes.

15. The voice guidance device according to claim 1, wherein the information request is received by the user at the guide point.

16. The voice guidance device according to claim 1, wherein the guide point is at an intersection.

17. The voice guidance device according to claim 1, wherein the processor outputs the information to a display that provides the output information to the user in addition to the speaker.

18. A voice guidance method executed by a voice guidance device configured to provide information on movement of a mobile body, the voice guidance method comprising:
  acquiring a current position of the mobile body;
  calculating a first guide route from the current position of the mobile body to a destination;
  outputting route guidance which guides a user to the destination along the first guide route via a speaker disposed in the mobile body;
  receiving a voice input of an information request by the user designating a second direction to travel at a guide point lying directly on the first the second direction being different from a first direction indicated by the first guide route at the guide point on the first guide route;
  calculating a second guide route advancing in the second direction at the guide point and reaching the destination, the second guide route deviating from the first guide route at the guide point; and
  outputting information on a comparison between the first guide route and the second guide route to the speaker disposed in the mobile body, the output information relating to one or more of: (i) respective distances to the destination along the first and second guide routes, (ii) respective times to the destination along the first and second guide routes, (iii) respective environments of the first and second guide routes, and (iv) respective traveling charges along the first and second guide routes,
  wherein the speaker broadcasts the output information to the user in the mobile body.

19. A non-transitory computer-readable medium storing a program executed by a voice guidance device including a computer and providing information on movement of a mobile body, the program causing the computer execute processing comprising:
  acquiring a current position of the mobile body;
  calculating a first guide route from the current position of the mobile body to a destination;
  outputting route guidance which guides a user to the destination along the first guide route via a speaker disposed in the mobile body;
  receiving a voice input of an information request by the user designating a second direction to travel at a guide point lying directly on the first guide route, the second direction being different from a first direction indicated by the first guide route at the guide point on the first guide route;
  calculating a second guide route advancing in the second direction at the guide point and reaching the destination, the second guide route deviating from the first guide route at the guide point; and
  outputting information on a comparison between the first guide route and the second guide route to the speaker disposed in the mobile body, the output information relating to one or more of: (i) respective distances to the destination along the first and second guide routes, (ii) respective times to the destination along the first and second guide routes, (iii) respective environments of the first and second guide routes, and (iv) respective traveling charges along the first and second guide routes,
  wherein the speaker broadcasts the output information to the user in the mobile body.

\* \* \* \* \*